(12) United States Patent
Hanai et al.

(10) Patent No.: US 10,618,827 B2
(45) Date of Patent: Apr. 14, 2020

(54) SCRUBBER WASTEWATER TREATMENT METHOD AND SCRUBBER WASTEWATER TREATMENT DEVICE

(71) Applicant: FUJI ELECTRIC CO., LTD., Kawasaki-shi, Kanagawa (JP)

(72) Inventors: Yosuke Hanai, Tokyo (JP); Nami Ishikawa, Koganei (JP); Yasuzo Sakai, Utsunomiya (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 265 days.

(21) Appl. No.: 15/616,526

(22) Filed: Jun. 7, 2017

(65) Prior Publication Data

US 2017/0267555 A1    Sep. 21, 2017

Related U.S. Application Data

(63) Continuation of application No. PCT/JP2016/052455, filed on Jan. 28, 2016.

(30) Foreign Application Priority Data

Mar. 13, 2015 (JP) ................................ 2015-050228

(51) Int. Cl.
*B01D 21/30* (2006.01)
*C02F 1/48* (2006.01)
(Continued)

(52) U.S. Cl.
CPC ............ *C02F 1/48* (2013.01); *B01D 21/0009* (2013.01); *B01D 21/01* (2013.01); *B01D 21/30* (2013.01);
(Continued)

(58) Field of Classification Search
CPC .... B01D 21/0009; B01D 21/01; B01D 21/30; B01D 2247/04; B01D 47/00; B03C 1/01;
(Continued)

(56) References Cited

U.S. PATENT DOCUMENTS 8,845,894 B2 * 9/2014 Isogami ............. B01D 21/0009
210/195.1
2006/0144771 A1   7/2006 Saho et al.
(Continued)

FOREIGN PATENT DOCUMENTS

CN        102826705 A    12/2012
CN        203715355 U     7/2014
(Continued)

OTHER PUBLICATIONS

Office Action dated Jan. 23, 2018 in related Japanese Patent Application No. 2017-506124, 6 pp.
(Continued)

*Primary Examiner* — Sharon Pregler

(57) ABSTRACT

A scrubber wastewater treatment method, according to one possible embodiment, includes obtaining a measurement of a turbidity or of a suspended substance concentration of scrubber wastewater and, upon determining that measurement of turbidity or suspended substance concentration is within a certain range, performing treatment. A scrubber wastewater treatment device, according to one possible embodiment, includes a magnetic powder adding device controllable to add a magnetic powder to be added to scrubber wastewater having been generated by treating combustion exhaust gas in a scrubber, and a controller configured to control an amount of the magnetic powder added by the magnetic powder adding device in accordance with a measurement value obtained by a sensor.

20 Claims, 14 Drawing Sheets

(51) Int. Cl.

| | |
|---|---|
| *B03C 1/14* | (2006.01) |
| *B03C 1/10* | (2006.01) |
| *B03C 1/28* | (2006.01) |
| *B03C 1/01* | (2006.01) |
| *B01D 21/01* | (2006.01) |
| *B01D 47/00* | (2006.01) |
| *B03C 1/02* | (2006.01) |
| *B01D 21/00* | (2006.01) |
| *C02F 1/00* | (2006.01) |
| *C02F 1/52* | (2006.01) |
| *C02F 1/66* | (2006.01) |
| *C02F 101/10* | (2006.01) |
| *C02F 101/32* | (2006.01) |
| *C02F 103/18* | (2006.01) |

(52) U.S. Cl.
CPC .............. *B01D 47/00* (2013.01); *B03C 1/01* (2013.01); *B03C 1/02* (2013.01); *B03C 1/10* (2013.01); *B03C 1/145* (2013.01); *B03C 1/288* (2013.01); *C02F 1/008* (2013.01); *C02F 1/488* (2013.01); *C02F 1/5209* (2013.01); *B01D 2247/04* (2013.01); *B03C 2201/18* (2013.01); *B03C 2201/24* (2013.01); *C02F 1/5245* (2013.01); *C02F 1/66* (2013.01); *C02F 2101/10* (2013.01); *C02F 2101/32* (2013.01); *C02F 2103/18* (2013.01); *C02F 2209/10* (2013.01); *C02F 2209/11* (2013.01)

(58) Field of Classification Search
CPC .. B03C 1/02; B03C 1/10; B03C 1/145; B03C 1/288; B03C 2201/18; B03C 2201/24; C02F 1/008; C02F 1/48; C02F 1/488; C02F 1/5209; C02F 1/5245; C02F 1/66; C02F 2101/10; C02F 2101/32; C02F 2103/18; C02F 2209/10; C02F 2209/11
See application file for complete search history.

(56) References Cited

U.S. PATENT DOCUMENTS

| | | |
|---|---|---|
| 2008/0035577 A1 | 2/2008 | Brook-Levinson et al. |
| 2008/0073278 A1 | 3/2008 | Cort |
| 2009/0211992 A1 | 8/2009 | Saho et al. |
| 2012/0043264 A1 | 2/2012 | Isogami et al. |
| 2013/0157833 A1 | 6/2013 | Königsson et al. |
| 2014/0367341 A1 | 12/2014 | Sasaki et al. |
| 2016/0016109 A1 | 1/2016 | Strandberg |

FOREIGN PATENT DOCUMENTS

| | | |
|---|---|---|
| EP | 2711067 A1 | 3/2014 |
| EP | 2955345 A1 | 12/2015 |
| JP | 10-33919 | 2/1998 |
| JP | 10-118518 | 5/1998 |
| JP | 11-165180 | 6/1999 |
| JP | 2001-129596 | 5/2001 |
| JP | 2004-81933 | 3/2004 |
| JP | 2006-187697 | 7/2006 |
| JP | 2008-62191 | 3/2008 |
| JP | 2012-40536 | 3/2012 |
| JP | 2012-152708 | 8/2012 |
| WO | 2014/118819 A1 | 8/2014 |
| WO | 2014/128261 A1 | 8/2014 |

OTHER PUBLICATIONS

Extended European Search Report dated Nov. 16, 2018 in corresponding European Application No. 16764539.9.
International Search Report dated Mar. 1, 2016 in corresponding International Application No. PCT/JP2016/052455.
Chinese Office Action dated Dec. 19, 2019 from Chinese Patent Application No. 201680003936.7, 27 pages.

* cited by examiner

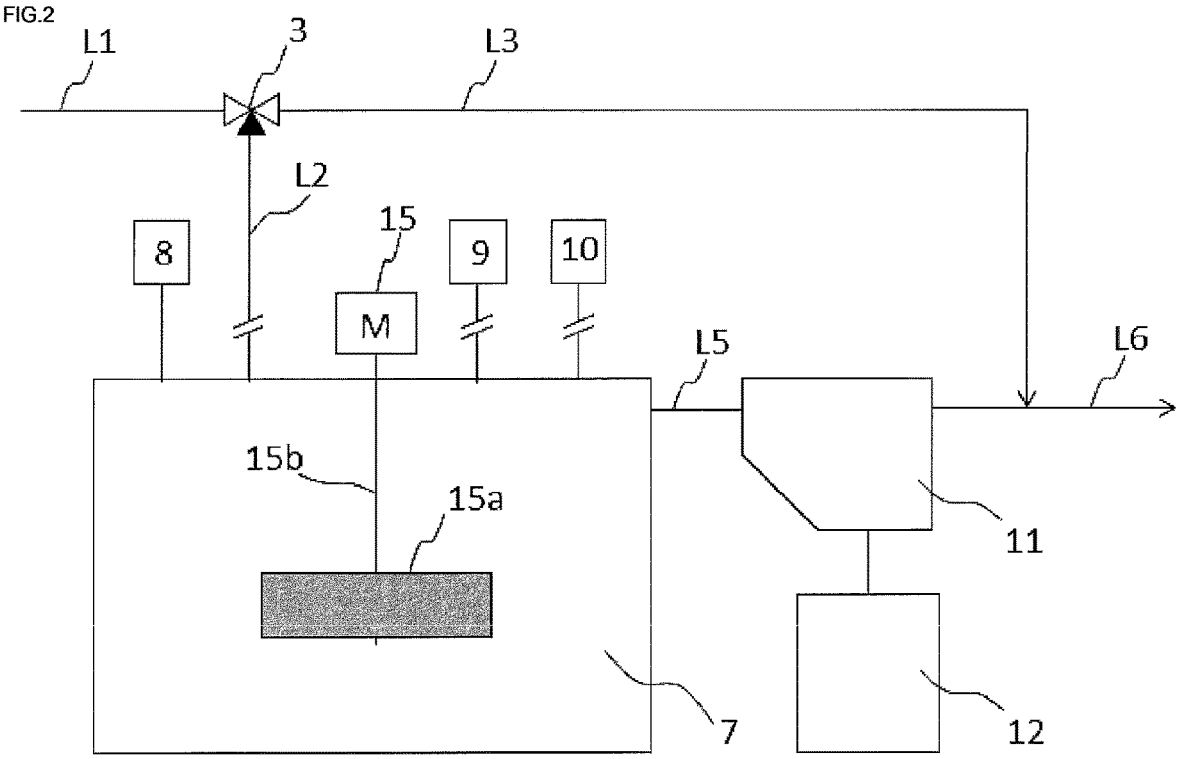
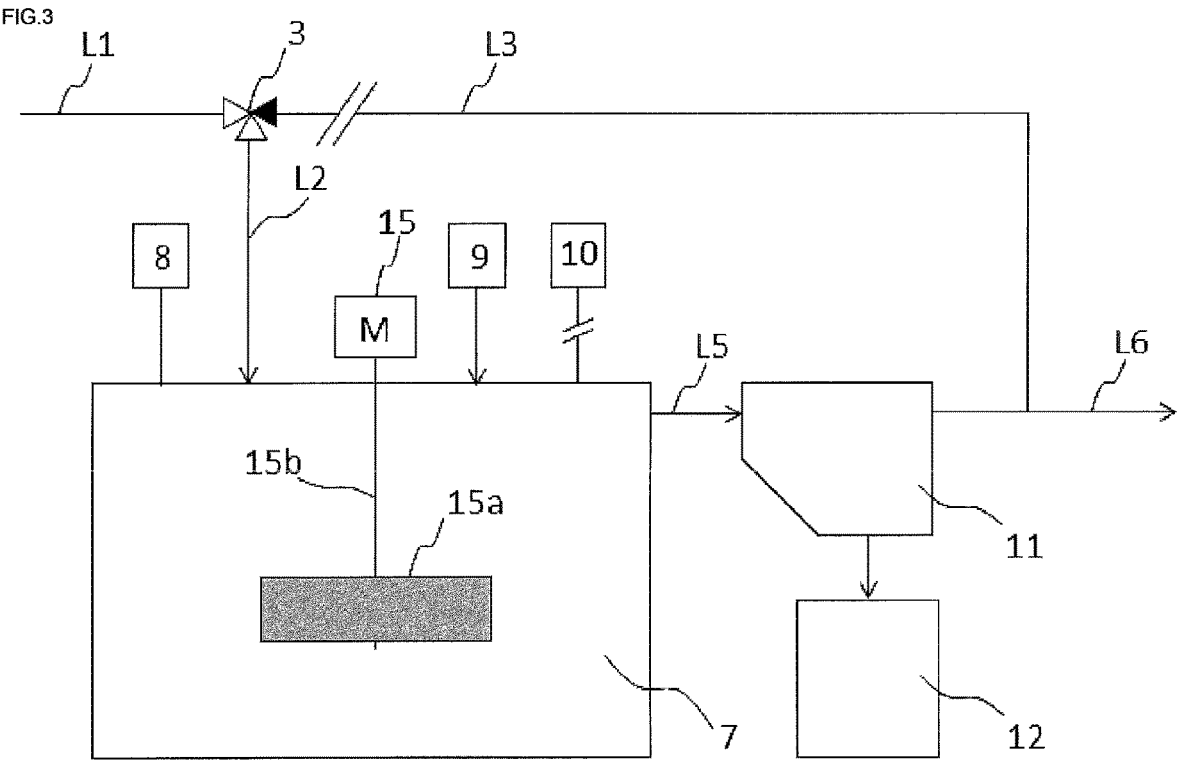

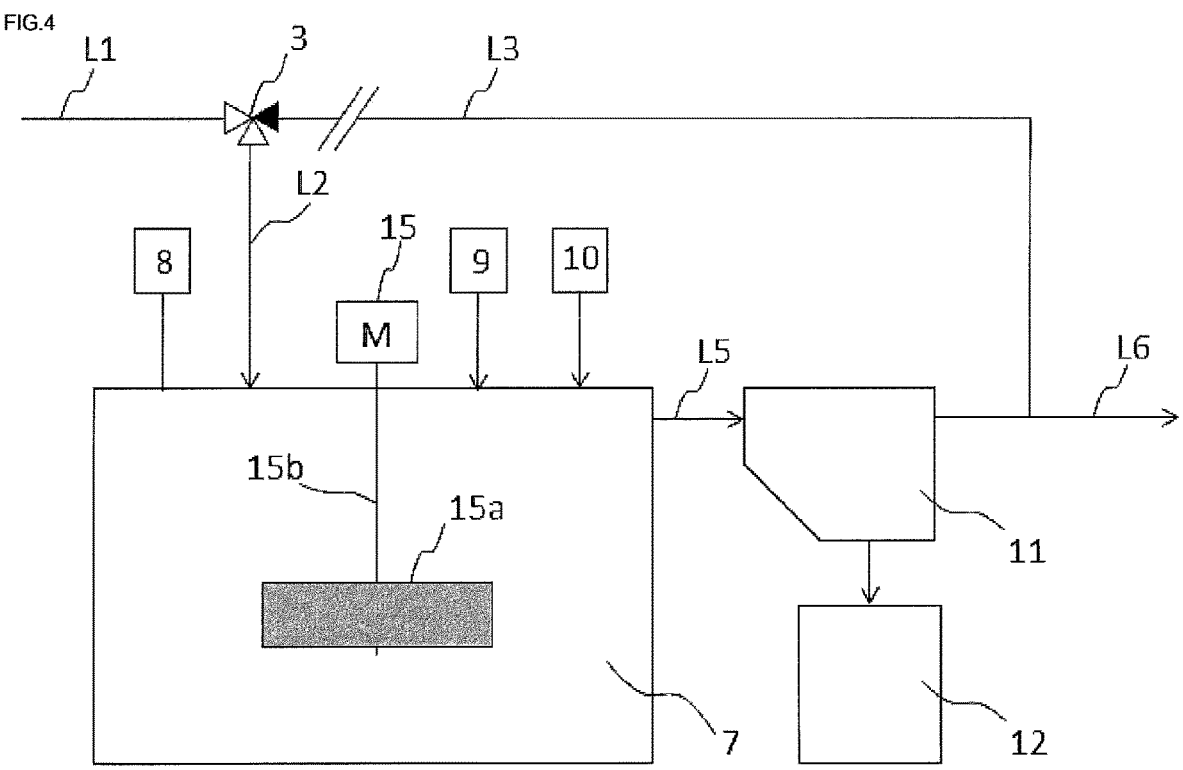

SCRUBBER WASTEWATER TREATMENT METHOD AND SCRUBBER WASTEWATER TREATMENT DEVICE

CROSS-REFERENCE TO RELATED APPLICATIONS

This application is a continuation application, filed under 35 U.S.C. § 111(a), of International Application PCT/JP2016/052455 filed on Jan. 28, 2016 and claims foreign priority to Japanese Patent Application No. 2015-050228, filed Mar. 13, 2015, the content of each of which is incorporated herein by reference in its entirety.

BACKGROUND

1. Field

The present disclosure relates to a method of treating scrubber wastewater generated when treating combustion exhaust gas with a scrubber, and to a scrubber wastewater treatment device.

2. Related Art

Combustion exhaust gas generated in a diesel engine of a ship, a furnace, or the like, includes black carbon, soot, oil droplets, and the like, because of which the exhaust gas is passed through a dirt collecting device (scrubber), cleaning water is brought into contact with the gas by spraying, and the toxic substances are removed by being shifted to the cleaning water side. Meanwhile, scrubber wastewater generated when treating with this kind of dirt collecting device (scrubber) includes collected toxic substances such as black carbon, soot, and oil droplets, and these too need to be removed so as not to be released into the environment. To date, methods such as centrifugal separation (see JP-A-2004-81933), filtration treatment (see JP-A-11-165180 (paragraph 0019)), coagulation-sedimentation (see JP-A-2001-129596 (paragraph 0004)), and the like, have been employed in the removal of toxic substances from scrubber wastewater.

SUMMARY

However, there is a problem with centrifugal separation in that a device consumes a large amount of power, and power generating equipment is needed for this, meaning that large-scale facilities are needed. Also, there is a problem with safety in a rolling ship or the like. In the case of filtration treatment, maintenance involving filter material replacement or cleaning due to clogging is troublesome. There are problems with coagulation-sedimentation in that coagulated floc needs to be left standing for a long time in order to cause the floc to precipitate, meaning that efficiency is poor, and a precipitate that has once been formed is liable to be stirred up in a rolling ship or the like, meaning that stable and efficient solid-liquid separation is difficult.

Therefore, the disclosure provides a scrubber wastewater treatment method and scrubber wastewater treatment device such that solid-liquid separation of a once formed floc is easy, with no need for large-scale facilities or troublesome maintenance.

In order to achieve the benefits described in the above paragraph, a scrubber wastewater treatment method of the disclosure is characterized in that a magnetic powder is added to scrubber wastewater generated when treating combustion exhaust gas in a scrubber, a bound substance of a suspended substance included in scrubber wastewater and the magnetic powder is formed, and the bound substance is magnetically separated, thereby cleaning the wastewater.

According to the scrubber wastewater treatment method of the disclosure, even in the case of a suspended substance included in scrubber wastewater such as black carbon, soot, or oil, which has a low specific gravity and precipitates with difficulty, the suspended substance can be efficiently removed, and the wastewater cleaned, by magnetically separating the suspended substance together with a magnetic powder.

The scrubber wastewater treatment method of the disclosure is preferably such that a coagulating agent is further added together with the magnetic powder to the scrubber wastewater, a bound substance of a suspended substance included in the scrubber wastewater and the magnetic powder is formed, and the bound substance is magnetically separated. By so doing, the efficiency of a bound substance of a suspended substance included in the scrubber wastewater and a magnetic powder being formed increases, because of which wastewater can be cleaned more efficiently.

Also, preferably, a range A wherein no suspended substance removal process is necessary, a range B wherein treatment can be carried out by an addition of a magnetic powder alone, and a range C wherein a magnetic powder and a coagulating agent need to be used concurrently, are set in advance with regard to a turbidity or suspended substance concentration of the scrubber wastewater, the turbidity or suspended substance concentration is measured, the scrubber wastewater is discharged as it is, or circulated and used, when the turbidity or suspended substance concentration is in range A, treatment is carried out by adding magnetic powder only to the scrubber wastewater when the turbidity or suspended substance concentration is in range B, and treatment is carried out by adding magnetic powder and a coagulating agent to the scrubber wastewater when the turbidity or suspended substance concentration is in range C. By so doing, magnetic powder or a coagulating agent is added in accordance with scrubber wastewater turbidity or suspended substance concentration, excessive use of magnetic powder or a coagulating agent is restricted, and running costs can be restricted.

Also, an amount of the magnetic powder added and/or an amount of the coagulating agent added when the range of the turbidity or suspended substance concentration is B or C is preferably an amount in accordance with the turbidity or suspended substance concentration. By so doing, excessive use of magnetic powder or a coagulating agent is effectively restricted, and running costs can be further restricted.

Also, a boundary value of the range A and range B is preferably set in a range of 25 to 100 NTU turbidity.

Also, a boundary value of the range A and range B is preferably set in a range of 10 to 50 mg/L suspended substance concentration.

Also, a boundary value of the range B and the range C is preferably set in a range of 50 to 150 NTU turbidity, and is a value 25 NTU or more greater than a boundary value of the range A and the range B.

Also, a boundary value of the range B and the range C is preferably set in a range of 20 to 100 mg/L suspended substance concentration, and is a value 10 mg/L or more greater than a boundary value of the range A and the range B.

Meanwhile, a scrubber wastewater treatment device of the disclosure is characterized by including a magnetic powder adding device that adds a magnetic powder to scrubber wastewater generated when treating combustion exhaust gas in a scrubber, and a magnetic separation device that magnetically separates a bound substance of a suspended substance included in the scrubber wastewater and the magnetic powder.

According to the scrubber wastewater treatment device of the disclosure, even in the case of a suspended substance included in scrubber wastewater such as black carbon, soot, or oil, which has a low specific gravity and precipitates with difficulty, the suspended substance can be efficiently removed, and the wastewater cleaned, by magnetically separating the suspended substance together with a magnetic powder.

The scrubber wastewater treatment device of the disclosure preferably further includes a coagulating agent adding device that adds a coagulating agent to the scrubber wastewater. By so doing, the efficiency of a bound substance of a suspended substance included in scrubber wastewater and a magnetic powder being formed by using a coagulating agent increases, because of which wastewater can be cleaned more efficiently.

Also, the scrubber wastewater treatment device of the disclosure preferably further includes a measuring device that measures a turbidity or suspended substance concentration of the scrubber wastewater, and a control device that controls an amount of magnetic powder added from the magnetic powder adding device in accordance with a measurement value from the measuring device. By so doing, magnetic powder is not used more than necessary, because of which running costs can be restricted.

Also, the scrubber wastewater treatment device of the disclosure preferably further includes a measuring device that measures a turbidity or suspended substance concentration of the scrubber wastewater, and a control device that controls an amount of magnetic powder added from the magnetic powder adding device and an amount of coagulating agent added from the coagulating agent adding device in accordance with a measurement value from the measuring device. By so doing, magnetic powder and coagulating agent are not used more than necessary, because of which running costs can be restricted.

Also, preferably, a range A wherein no suspended substance removal process is necessary, a range B wherein treatment can be carried out by an addition of a magnetic powder alone, and a range C wherein a magnetic powder and a coagulating agent need to be used concurrently, are input in advance into the control device with regard to a turbidity or suspended substance concentration of the scrubber wastewater, the turbidity or suspended substance concentration is measured by the measuring device and compared with the ranges input in advance into the control device, the scrubber wastewater is discharged as it is, or circulated and used, when the turbidity or suspended substance concentration is in range A, treatment is carried out by adding magnetic powder only to the scrubber wastewater when the turbidity or suspended substance concentration is in range B, and treatment is carried out by adding magnetic powder and a coagulating agent to the scrubber wastewater when the turbidity or suspended substance concentration is in range C.

According to the disclosure, even in the case of a suspended substance included in scrubber wastewater such as black carbon, soot, or oil, which has a low specific gravity and precipitates with difficulty, the suspended substance can be efficiently removed, and the wastewater cleaned, by magnetically separating the suspended substance together with a magnetic powder. Also, by using a coagulating agent concurrently, the efficiency of a bound substance of a suspended substance included in scrubber wastewater and a magnetic powder being formed increases, because of which wastewater can be cleaned more efficiently.

BRIEF DESCRIPTION OF THE DRAWINGS

FIG. 2 is an illustration of a first operation example of the aforementioned device.

FIG. 3 is an illustration of a second operation example of the aforementioned device.

FIG. 4 is an illustration of a third operation example of the aforementioned device.

DESCRIPTION OF EMBODIMENTS

Figure 1:
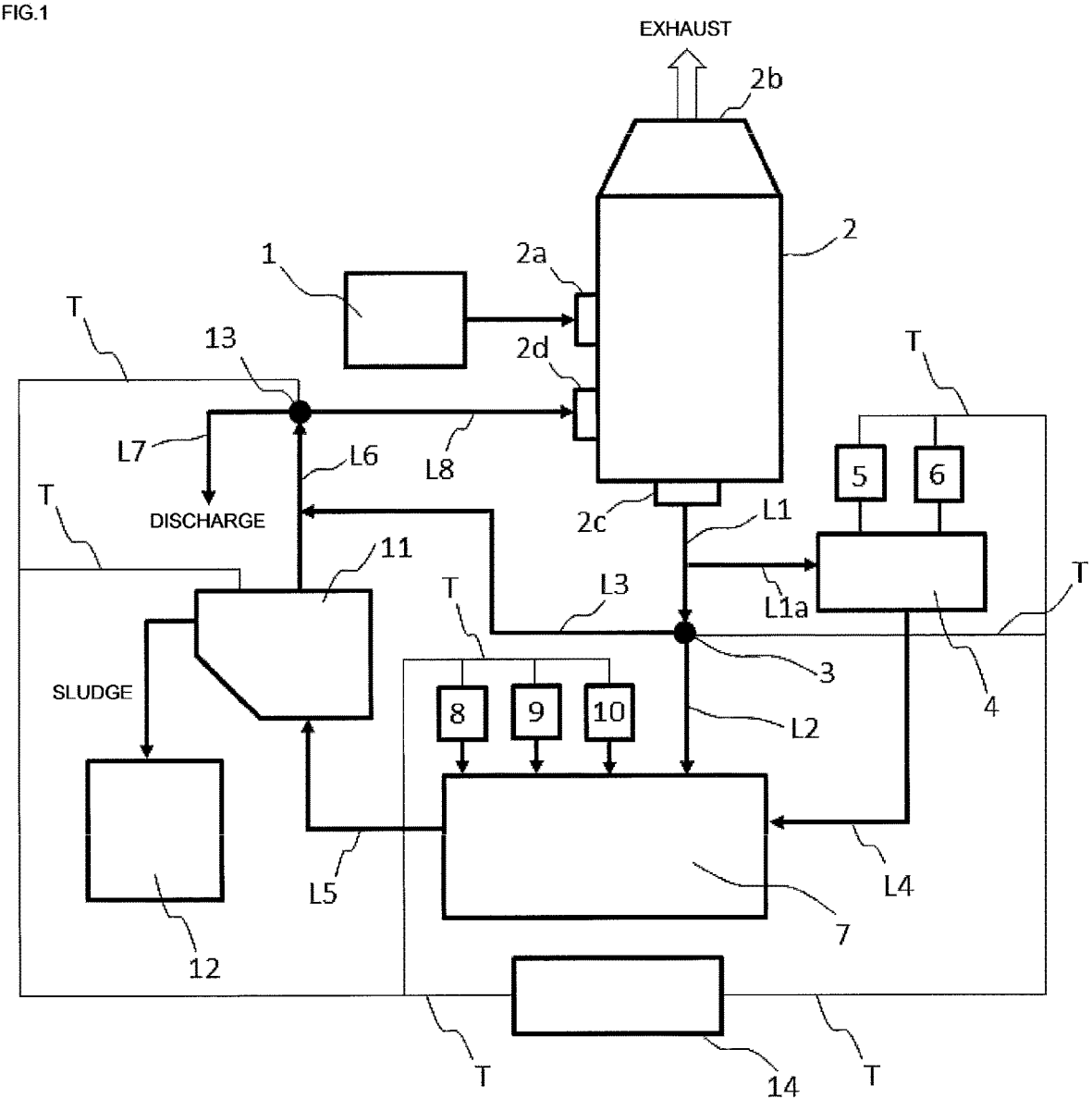
FIG. 1 is a schematic configuration diagram of a device according to a first embodiment for implementing a method of the disclosure.

Hereafter, while referring to the drawings, a description will be given of embodiments of the disclosure.

FIG. 1 shows a device according to a first embodiment for implementing a method of the disclosure. In this embodiment, exhaust gas generated in an engine 1 is introduced into a scrubber 2 from an air inlet 2a and comes into gas-liquid contact with scrubber cleaning water, and after toxic substances such as black carbon, soot, and oil droplets are removed by shifting to the cleaning water side, the exhaust gas is discharged from an exhaust port 2b. Also, scrubber wastewater generated at this time passes from a drain port 2c into a pipe L1, and is introduced into a pipe L2 or pipe L3 via a valve 3. Further, the pipe L2 communicates with a mixing tank 7 and a magnetic separation device 11 downstream of the mixing tank 7, while the pipe L3 bypasses the mixing tank 7 and magnetic separation device 11, and communicates with a pipe L6 downstream of the mixing tank 7 and magnetic separation device 11. Owing to this bypass route, wastewater is discharged without receiving treatment in the mixing tank 7 or the magnetic separation device 11, or is circulated and utilized as scrubber cleaning water. Also, the pipe L1 branches on an upstream side of the valve 3 into a pipe L1a that communicates with a measurement tank 4, one portion of the wastewater is transferred through the pipe L1a to the measurement tank 4 and accumulates there, and the wastewater can be inspected using a pH measuring device 5 or a water quality measuring device 6. In this embodiment, one portion of the wastewater is accumulated in the measurement tank 4 and inspected, but the pipe L1a may stand alone without the tank being provided, and wastewater flowing inside the pipe may be inspected directly. Also, although the piping is branched and one portion of the wastewater is removed for inspection, wastewater flowing inside the pipe L1 may be inspected directly without removing one portion of the wastewater. Also, wastewater after inspection is transferred through a pipe L4 to the mixing tank 7, but the wastewater that has been inspected too, when not needed, may be returned to the pipe L1 upstream of the valve 3 and downstream of a branch point, and be able to bypass the mixing tank 7 and magnetic separation device 11 through the pipe L3.

Water quality categories inspected by the water quality measuring device (or sensor) 6 include wastewater turbidity or suspended substance (SS) concentration ("suspended substance concentration" in this specification) as representative indices of suspended substances such as black carbon, soot, and oil droplets included in wastewater. For example, wastewater turbidity can be measured using a method compliant with 9.3 of JIS K0101, or the like. Also, wastewater suspended substance concentration can be measured using a method compliant with 14.1 of JIS K0102, or the like.

An agitating device 15 having an agitating blade 15a rotated via a pivot 15b by a motor M is provided in the mixing tank 7, as shown in FIGS. 2 to 4. Further, wastewater is mixed by the agitating device 15 in the mixing tank 7 with an alkaline agent or acid agent added from a pH regulating device 8, magnetic powder added from a magnetic powder adding device 9, and a coagulating agent added from a coagulating agent adding device 10, whereby a bound substance (hereafter referred to as "magnetic floc") of suspended substances such as black carbon, soot, and oil droplets included in the wastewater and magnetic powder can be formed. The pH of wastewater is preferably regulated to 4 to 11. By so doing, alkali consumed by the coagulating agent can be supplied, because of which magnetic floc can be efficiently formed. The pH is preferably regulated in accordance with the pH state of wastewater measured by the pH measuring device 5.

The magnetic powder can be added in powder form, or added in a state wherein magnetic powder is dispersed in a dispersion medium such as water. A material of the magnetic powder may be either a normal magnetic powder or strong magnetic powder, including, for example, a ferric oxide such as triiron tetraoxide, cobalt, chromium oxide, ferrite, and the like. Preferably, a particle diameter of the magnetic powder is normally within a range of 0.05 µm or greater, 10 µm or less, and more preferably still, within a range of 0.05 µm or greater, 5 µm or less. Also, preferably, a coercive force of the magnetic powder is normally within a range of $10^4/4\pi A/m$ or greater, $4 \times 10^5/4\pi A/m$ or less, and more preferably still, within a range of $2 \times 10^5/4\pi A/m$ or greater, $3 \times 10^5/4\pi A/m$ or less. With regard to an amount of magnetic powder added, the magnetic powder is preferably added so that a magnetic powder mass is 0.1 to 10 with respect to a suspended substance mass of 1, and more preferably still, added so that the magnetic powder mass is 0.5 to 5. When the amount added is less than this range, there is a tendency for the magnetic floc forming efficiency to worsen, and when the amount added exceeds the range, the magnetic powder is unnecessarily used excessively, and a cost thereof increases, meaning that both cases are undesirable. Also, the amount of magnetic powder added is preferably regulated in accordance with a turbidity or suspended substance concentration of wastewater measured by the water quality measuring device 6. In this case, for example, a table of a relationship between measurement value and amount of magnetic powder added may be stored in advance in a control device, to be described hereafter, and the amount added determined by referring to the table.

The coagulating agent can be added in powder form, or added in a state wherein a coagulating agent is dispersed in a dispersion medium such as water. For example, polyaluminum chloride (PAC), ferric polysulfate, aluminum sulfate (alum), a polymer (nonionic, cationic, anionic, dipolar), and the like, are included as coagulating agent components, and the coagulating agent can be selected in accordance with wastewater properties. With regard to an amount of coagulating agent added, the coagulating agent is preferably added so that a coagulating agent mass is 0.005 to 1 with respect to a suspended substance mass of 1, and more preferably still, added so that the coagulating agent mass is 0.01 to 0.5. When the amount added is less than this range, there is a tendency for the efficiency of aiding magnetic floc formation to worsen, and when the amount added exceeds the range, the coagulating agent is unnecessarily used excessively, and a cost thereof increases, meaning that both cases are undesirable. Also, the amount of coagulating agent added is preferably regulated in accordance with a turbidity or suspended substance concentration of wastewater measured by the water quality measuring device 6. In this case, for example, a table of a relationship between measurement value and amount of coagulating agent added may be stored in advance in a control device, to be described hereafter, and the amount added determined by referring to the table.

Wastewater including magnetic floc formed by mixing with magnetic powder, a coagulating agent, and the like in the mixing tank 7 is introduced through a pipe L5 into the magnetic separation device (magnetic separator) 11 and subjected to a magnetic separation process, and sludge collected as an aggregate (lump of magnetic floc) by the magnetic separation process is stored in a sludge tank 12. The magnetic separation process in the magnetic separation device 11 will be described hereafter.

A liquid portion (a clear supernatant) after magnetic separation is discharged from the pipe L6 via a valve 13 and through a pipe L7, or introduced through a pipe L8 into the scrubber 2 from a liquid inlet 2d, and reutilized as scrubber cleaning water.

The device of this embodiment further includes a control device 14, wherein the control device 14 is connected by wiring T to each of the pH measuring device 5, the water quality measuring device 6, the pH regulating device 8, the magnetic powder adding device 9, the coagulating agent adding device 10, the magnetic separation device 11, and valves 3 and 13, and can send and receive signals, store determination data, and determine by comparing with the determination data. That is, the control device 14 can, for example, receive a signal relating to a measurement value from the pH measuring device 5 or the water quality measuring device 6, determine whether or not the received measurement value is within a predetermined range, send a signal relating to the amount of alkaline agent or acid agent to be added to the pH regulating device 8, a signal relating to the amount of magnetic powder to be added to the magnetic powder adding device 9, and a signal relating to the amount of coagulating agent to be added to the coagulating agent adding device 10, send a signal relating to the necessity or otherwise of operating to the magnetic separation device 11, and send a signal relating to pipe connection by the valves 3 and 13.

The foregoing description has as a precondition an aspect wherein all wastewater is treated, but a configuration may be such that wastewater is caused to diverge using a pipe, valve, or the like, one portion is treated, and the treated water and untreated wastewater are mixed and discharged, or reutilized as scrubber cleaning water. In this case, the valve 3 may be of a configuration such that the valve 3 can arbitrarily change the ratios of the amounts of wastewater passing into the pipe 2 and the pipe L3, and can arbitrarily select the ratios of the amount of wastewater to be treated and the amount of wastewater not to be treated.

FIG. 1 can also be understood as illustrating a system comprising the various elements illustrated in this figure, which include the scrubber 2 and the various wastewater treatment features discussed above.

FIG. 2 shows a first operation example of the heretofore described device. In this operation example, wastewater from the pipe L1 flows into the pipe L3 owing to a connection of the valve 3, which is formed of a three-way valve, bypasses the mixing tank 7 and magnetic separation device 11, and is transferred to the pipe L6 downstream of the mixing tank 7 and magnetic separation device 11. This kind of operation example is appropriate when the amount of suspended substances in the wastewater is within a range such that a suspended substance removal process is unnecessary (hereafter referred to as "range A"), and there is no need to remove the suspended substances in the wastewater. An upper limit value of the range A (hereafter referred to as a "boundary value AB") differs in accordance with a scrubber device configuration, application, discharge regulation standard, and the like, but is preferably set, for example, within a range of 25 to 100 NTU when taking wastewater turbidity as an index, or within a range of 10 to 50 mg/L when taking wastewater suspended substance concentration as an index. In this case, there is no addition of magnetic powder from the magnetic powder adding device 9, no addition of the coagulating agent from the coagulating agent adding device 10, or the like, and the agitating device 15 and the magnetic separation device 11 do not operate either. Addition of an alkaline agent or an acid agent from the pH regulating device 8 is arbitrary.

FIG. 3 shows a second operation example of the heretofore described device. In this operation example, wastewater from the pipe L1 flows into the pipe L2 owing to a connection of the valve 3, which is formed of a three-way valve, and is transferred to the mixing tank 7. In the mixing tank 7, magnetic powder is added from the magnetic powder adding device 9 to wastewater that is stored in the tank for a certain time, and the wastewater is agitated by the agitating device 15, thereby causing magnetic floc to be formed. Addition of an alkaline agent or an acid agent from the pH regulating device 8 is arbitrary. This kind of operation example is appropriate in a range wherein wastewater suspended substances can be treated with magnetic powder alone to form magnetic floc (hereafter referred to as "range B"), and there is no need to go as far as adding a coagulating agent. An upper limit value of the range B (hereafter referred to as a "boundary value BC") differs in accordance with a scrubber device configuration, an application, a discharge regulation standard, and the like, but is preferably, for example, a value within a range of 50 to 150 NTU, and 25 NTU or more greater than the boundary value AB, when taking wastewater turbidity as an index, or a value within a range of 20 to 100 mg/L, and 10 mg/L or more greater than the boundary value AB, when taking wastewater suspended substance concentration as an index. Provided that wastewater suspended substances are within the range B, the wastewater suspended substances can be treated with magnetic powder alone to form magnetic floc. Therefore, no addition of coagulating agent from the coagulating agent adding device 10 is carried out.

FIG. 4 shows a third operation example of the heretofore described device. In this operation example, wastewater from the pipe L1 flows into the pipe L2 owing to a connection of the valve 3, which is formed of a three-way valve, and is transferred to the mixing tank 7. In the mixing tank 7, together with magnetic powder being added from the magnetic powder adding device 9, a coagulating agent is added from the coagulating agent adding device 10 to wastewater that is stored in the tank for a certain time, and the wastewater is agitated by the agitating device 15, thereby causing magnetic floc to be formed. Addition of an alkaline agent or an acid agent from the pH regulating device 8 is arbitrary. This kind of operation example is appropriate in a range wherein wastewater suspended substances cannot be treated with magnetic powder alone, and it is necessary to use a coagulating agent concurrently (hereafter referred to as "range C"). Although differing in accordance with a scrubber device configuration, an application, a discharge regulation standard, and the like, the range C is preferably a range exceeding the boundary value BC, that is, a range exceeding 50 to 150 NTU when taking wastewater turbidity as an index, or a range exceeding 20 to 100 mg/L when taking wastewater suspended substance concentration as an index. When adding the coagulating agent, an agitation operation is desirably regulated so as to agitate strongly at first in order to form a minute micro-floc, and next to agitate weakly in order to cause a larger floc to grow, and these operations may be carried out separately by dividing the mixing tank 7 into two or more receptacles.

Figure 5:
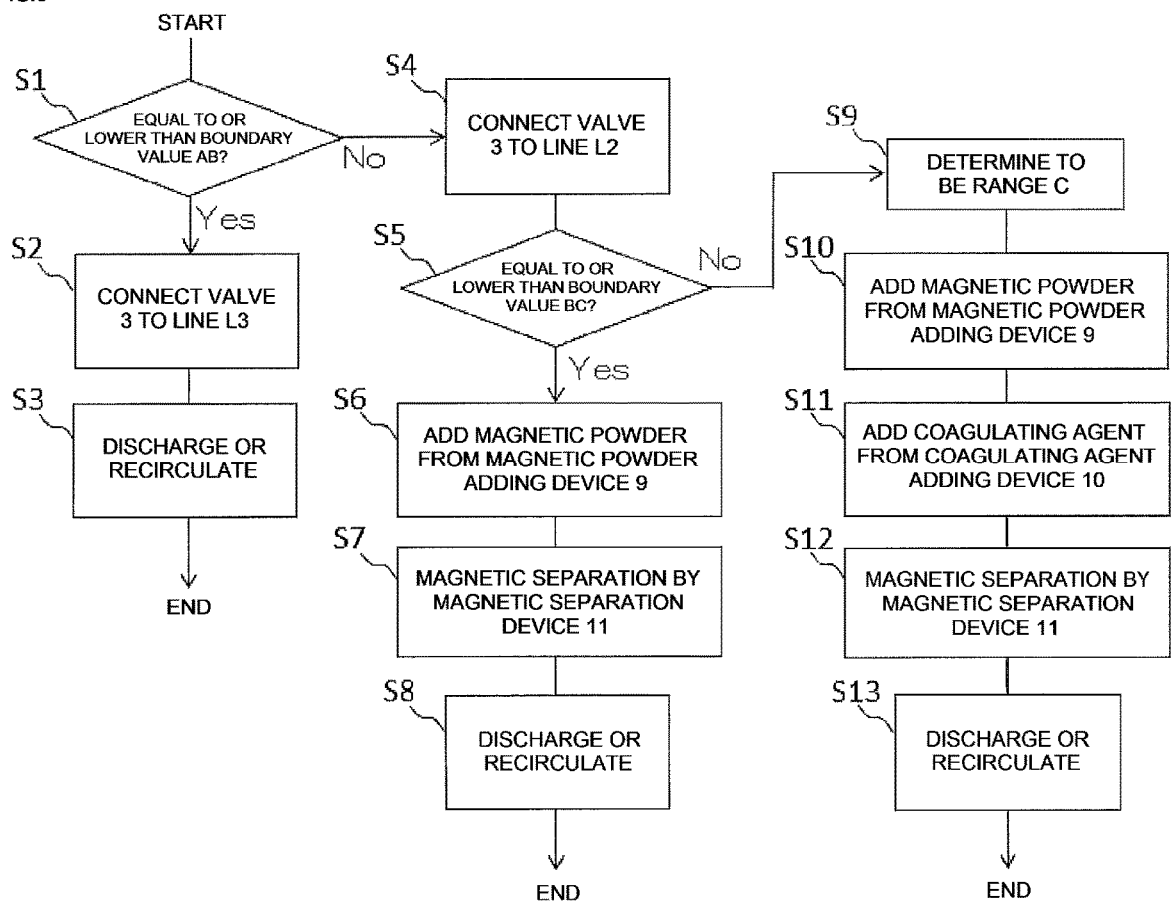
FIG. 5 is a flowchart representing an example of the first to third operation examples being reciprocally controlled.

The first to third operation examples can be controlled by, for example, the water quality measuring device 6 and the control device 14. FIG. 5 shows a flowchart representing one example of the control. In this control example, firstly, wastewater is inspected by the water quality measuring device 6, a measurement value thereof is compared with the determination data stored in advance in the control device 14, and it is determined whether the measurement value is within the range A wherein a suspended substance removal process is unnecessary, in other words, whether or not the measurement value is equal to or lower than the boundary value AB (step S1). When the measurement value is equal to or lower than the boundary value AB, the valve 3 is connected to the pipe L3 (step S2), and the wastewater is discharged or recirculated (step S3), according to the first operation example.

Next, when the measurement value exceeds the boundary value AB, the valve 3 is connected to the pipe L2 (step S4), the measurement value from the water quality measuring device 6 is compared with the determination data stored in advance in the control device 14, and it is determined whether the measurement value is within the range B wherein processing can be carried out by adding only magnetic powder, in other words, whether or not the measurement value is equal to or lower than the boundary value BC (step S5). When the measurement value is equal to or lower than the boundary value BC, magnetic floc is caused to form by adding magnetic powder from the magnetic powder adding device 9 (step S6), the wastewater is magnetically separated into an aggregate (lump of magnetic floc) and a liquid portion (clear supernatant) by the magnetic separation device 11 (step S7), and the wastewater after treatment is discharged or recirculated (step S8), according to the second operation example.

Next, when the measurement value exceeds the boundary value BC, it is determined that the measurement value is within the range C wherein magnetic powder and a coagulating agent need to be used concurrently (step S9), and together with magnetic powder being added from the magnetic powder adding device 9 (step S10), a coagulating agent is added from the coagulating agent adding device 10, whereby magnetic floc is caused to form (step S11), the wastewater is magnetically separated into an aggregate (lump of magnetic floc) and a liquid portion (clear supernatant) by the magnetic separation device 11 (step S12), and the wastewater after treatment is discharged or recirculated (step S13), according to the third operation example.

When carrying out the heretofore described kind of control, range A, range B, and range C need to be set as ranges that do not overlap each other. For example, setting is such that range A is equal to or lower than the boundary value AB, range B exceeds the boundary value AB and is equal to or lower than the boundary value BC, range C exceeds the boundary value BC, and the like.

It is noted that range A may be referred to as a first range, and ranges B and C may collectively be referred to as a second range, where ranges B and C are respective portions of the second range.

Hereafter, while referring to FIGS. 6 and 7, a description will be given of the magnetic separation process in the magnetic separation device 11.

Figure 6:
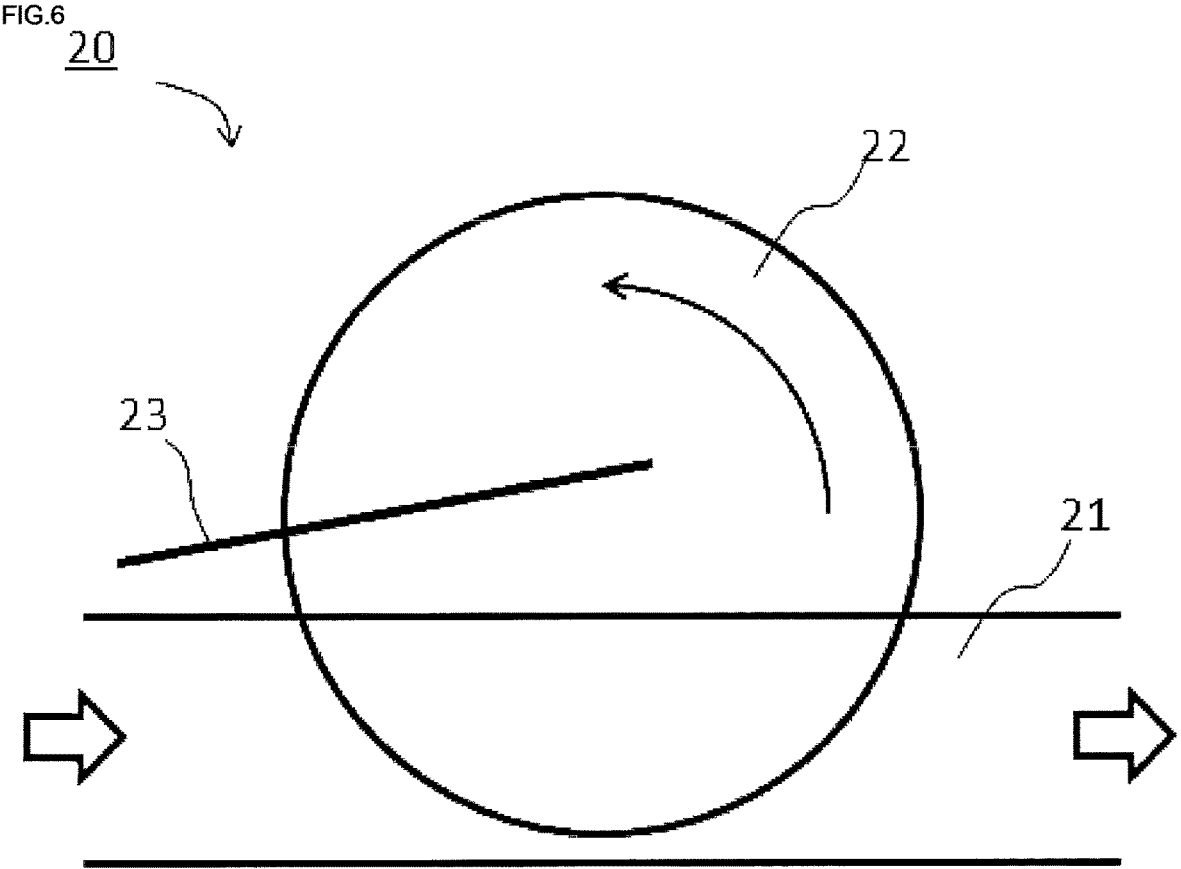
FIG. 6 is a schematic configuration diagram showing an example of a magnetic separation device included in the device according to the first embodiment.

FIG. 6 shows an example of a magnetic separation device included in the device according to the first embodiment. A channel 21 that communicates with the pipe L5 extending from the mixing tank 7 is provided in this magnetic separation device 20, and the channel 21 has a predetermined capacity, because of which, when wastewater that has finished treatment in the mixing tank 7 passes through the channel 21, the wastewater passes through while being retained for a predetermined time. A rotating disk 22 is disposed above the channel 21 so that approximately a lower half portion of the rotating disk 22 is immersed in the wastewater flowing through the channel 21, and the rotating disk 22 is rotated by unshown drive means. In FIG. 6, a direction of rotation in a circumferential direction of the rotating disk 22 is a forward direction with respect to the flow in a portion immersed in the wastewater. Also, a multiple of blades of the rotating disk 22 are coaxially arrayed in parallel at predetermined intervals in an unshown depth direction, and are disposed over practically the whole of a width direction of the channel 21, in a state such as to leave a slight gap. A magnet is disposed over the whole of a surface of the rotating disk 22, or within a range that can practically cover the depth of water flowing through the channel 21, and magnetic floc formed in the wastewater adheres to the surface of the rotating disk 22 owing to magnetic attraction force of the magnet. A scraper 23 is disposed along a surface on either side of the rotating disk 22 in a portion of the rotating disk 22 exposed on a surface of the wastewater, and sludge wherein magnetic floc forms a lump is scraped off and stored in the sludge tank 12.

Figure 7:
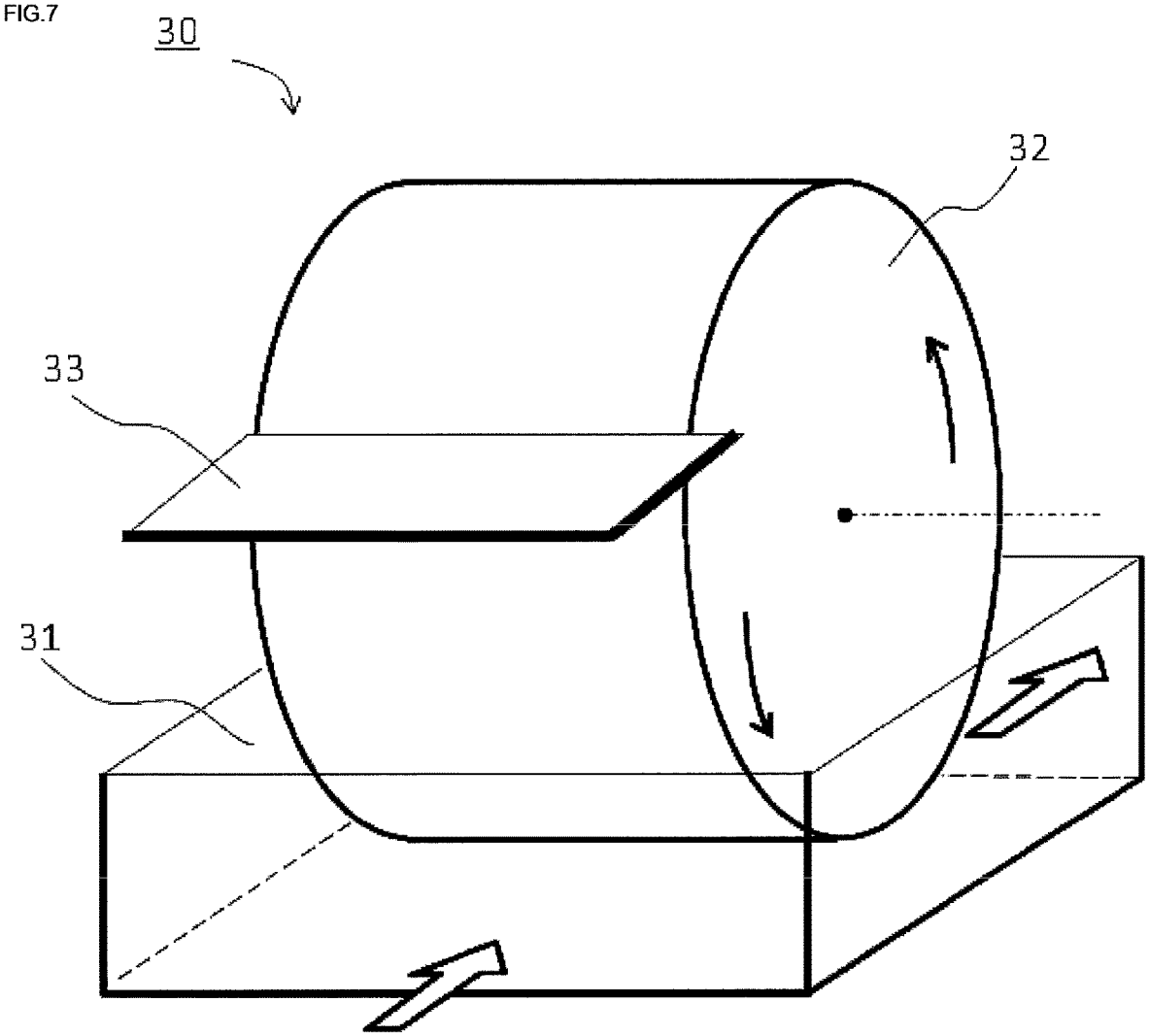
FIG. 7 is a schematic configuration diagram showing another example of a magnetic separation device included in the device according to the first embodiment.

FIG. 7 shows another example of a magnetic separation device included in the device according to the first embodiment. A rotating drum 32, on a cylindrical side surface of which a magnet is disposed, is used in this magnetic separation device 30 instead of the rotating disk 22 shown in FIG. 6. The rotating drum 32 is disposed so that a lower half portion is immersed in the wastewater, and a scraper 33 is disposed along a side surface of the rotating drum 32 in a portion of the rotating drum 32 exposed on the surface of the wastewater. Magnetic floc formed in the wastewater adheres to the side surface of the rotating drum 32 owing to the magnet disposed on the rotating drum 32, and sludge wherein magnetic floc forms a lump is scraped off by the scraper 33 and stored in the sludge tank 12.

Figure 8:
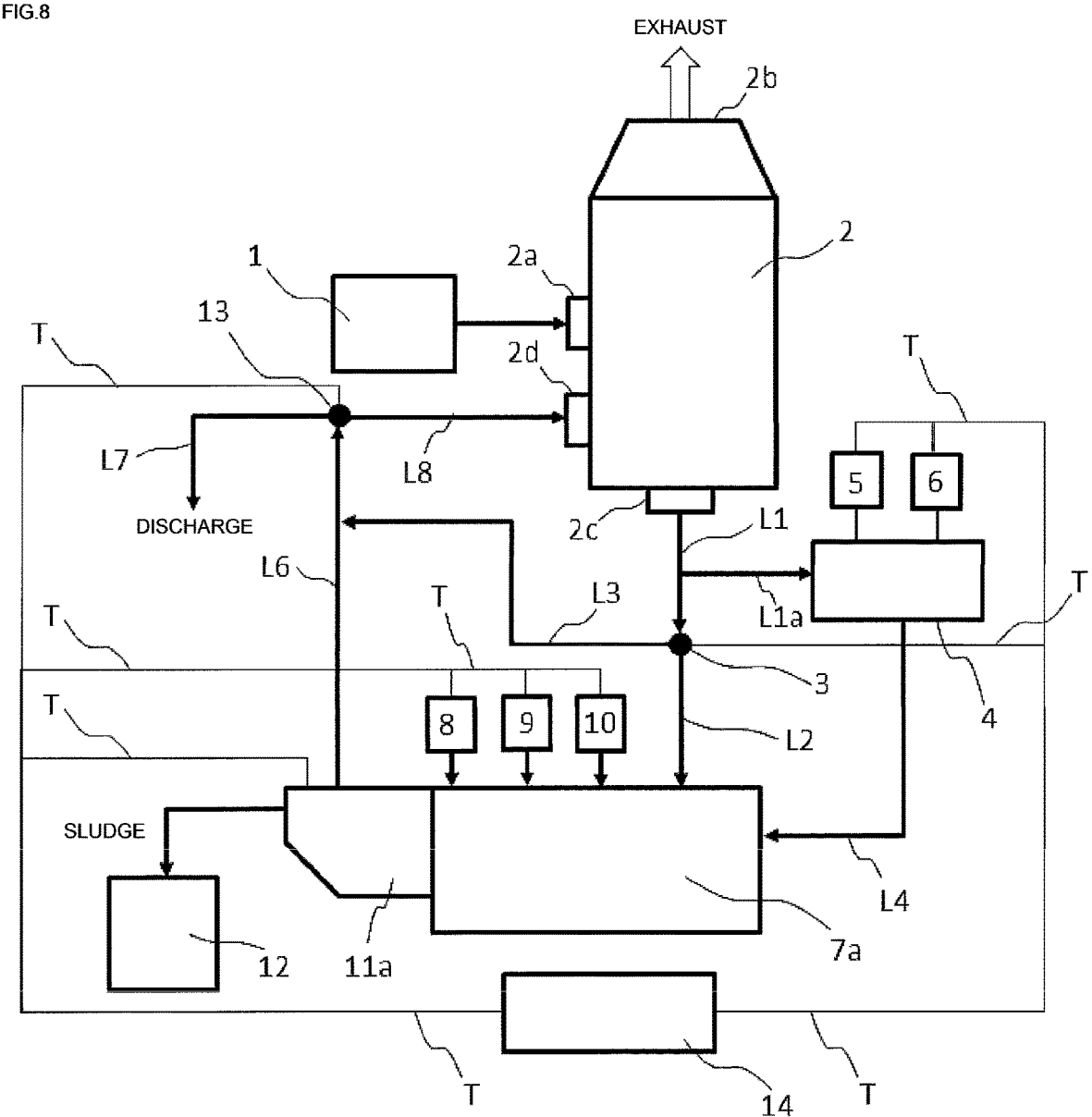
FIG. 8 is a schematic configuration diagram of a device according to a second embodiment for implementing the method of the disclosure.

FIG. 8 shows a device according to a second embodiment for implementing the method of the disclosure. The device according to this embodiment differs from the device according to the first embodiment in that a mixing tank 7a and a magnetic separation device 11a are configured integrally.

Figure 9:
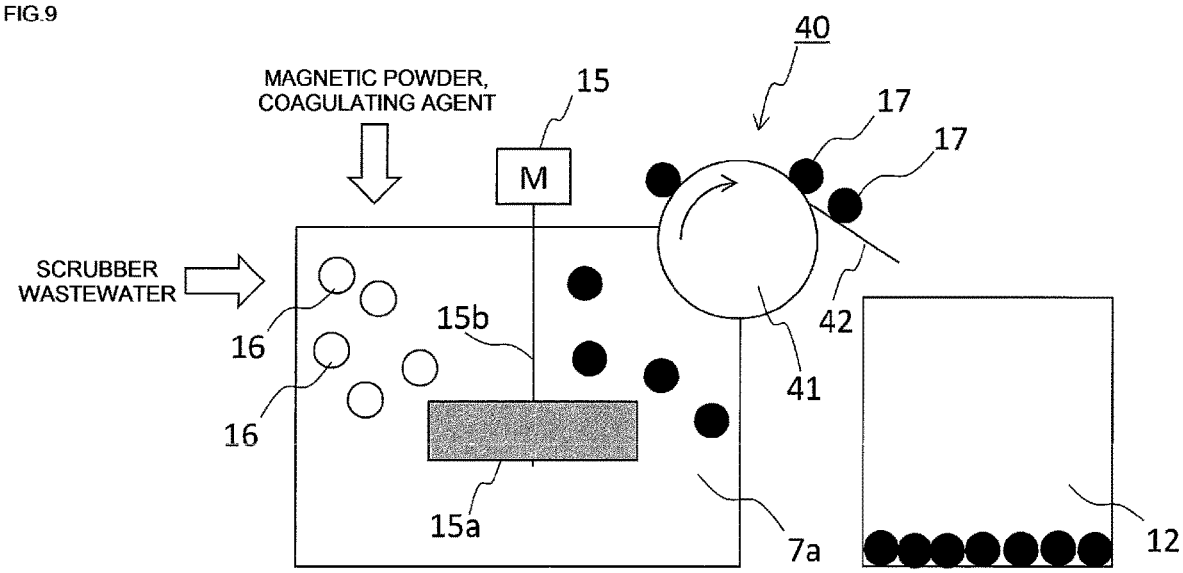
FIG. 9 is a schematic configuration diagram showing an example of a magnetic separation device included in the device according to the second embodiment.

FIG. 9 shows an example of a magnetic separation device included in the device according to the second embodiment. This magnetic separation device 40 shares a basic configuration with the magnetic separation device 30 illustrated in FIG. 7, but is installed directly in the mixing tank 7a rather than being a channel extending from the mixing tank. Further, a lower half portion of a rotating drum 41 of the magnetic separation device 40 is disposed so as to be immersed in wastewater in the mixing tank 7a, the magnetic floc 17 formed by adding magnetic powder, or magnetic powder and a coagulating agent, to a suspended substance 16 such as black carbon, soot, or oil and mixing in the mixing tank 7a is caused to adhere to a side surface of the rotating drum 41 by a magnet disposed on the rotating drum 41, and sludge wherein magnetic floc forms a lump is scraped off by the scraper 42 and stored in the sludge tank 12.

Figure 10:
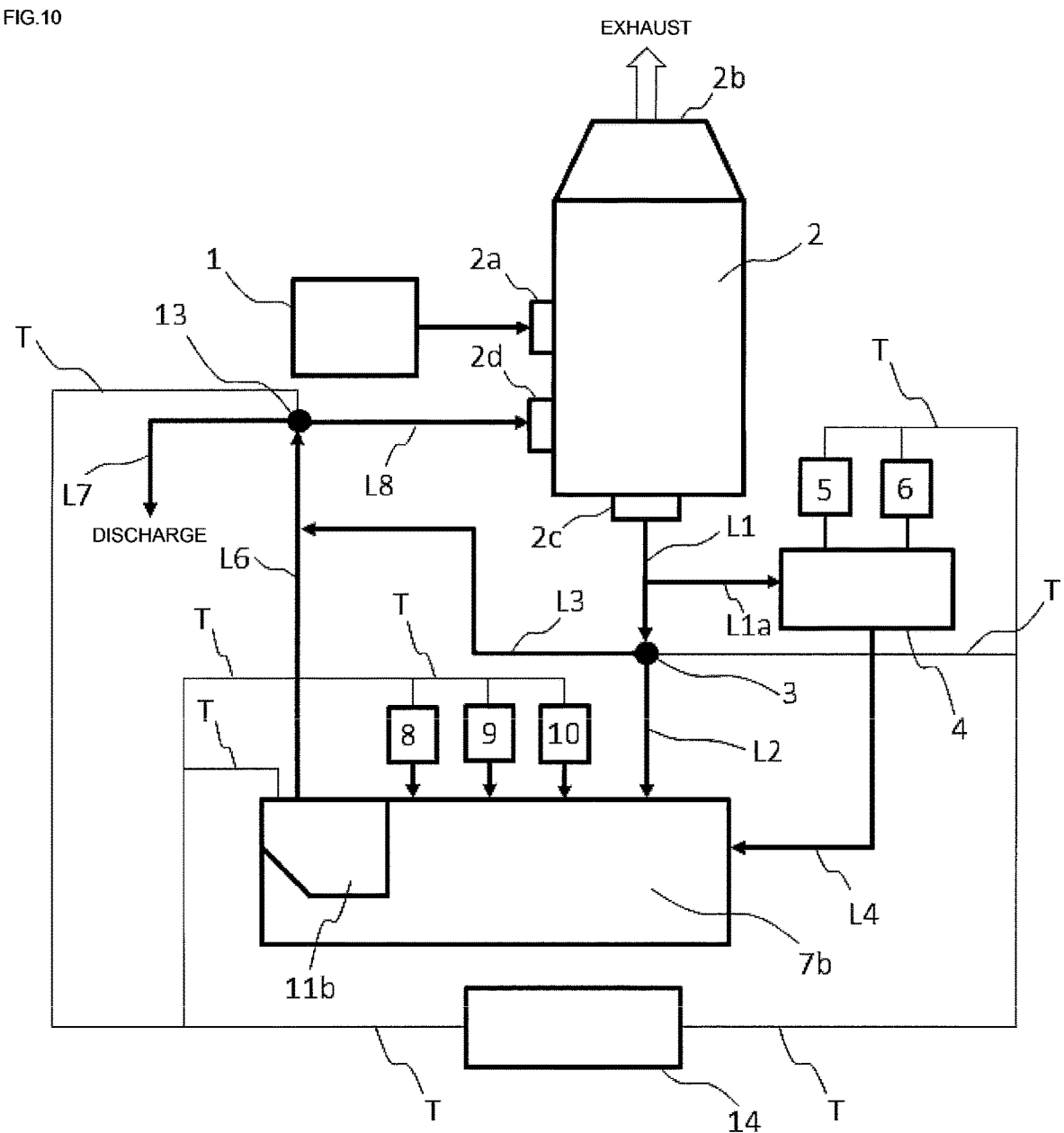
FIG. 10 is a schematic configuration diagram of a device according to a third embodiment for implementing the method of the disclosure.

FIG. 10 shows a device according to a third embodiment for implementing the method of the disclosure. The device according to this embodiment differs from the device according to the first embodiment in that a mixing tank 7b and a magnetic separation device 11b are configured integrally, and furthermore, the mixing tank 7b also performs a function of a sludge tank. That is, in this embodiment, sludge accumulates in a bottom portion of the mixing tank 7b, and the sludge is regularly discharged from an unshown outlet.

Figure 11:
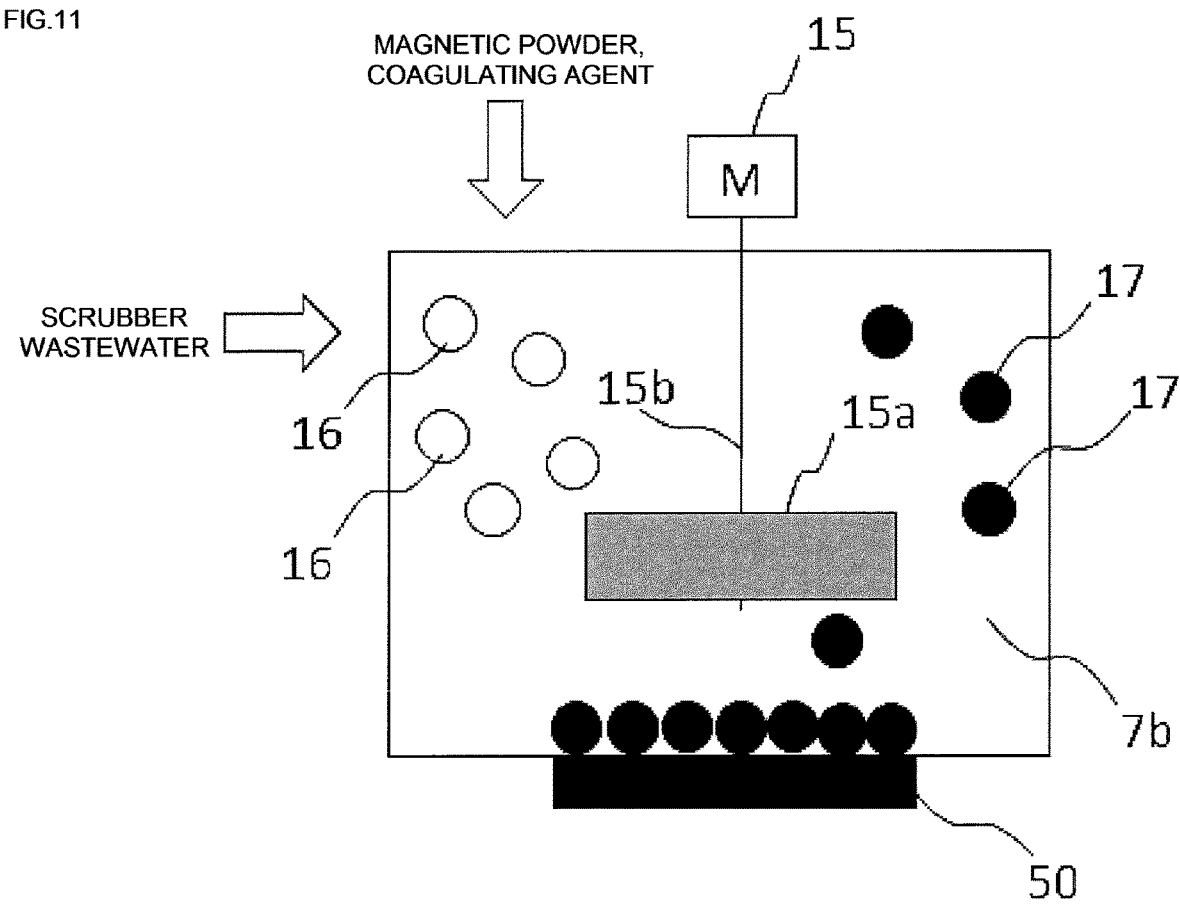
FIG. 11 is a schematic configuration diagram showing an example of a magnetic separation device included in the device according to the third embodiment.

FIG. 11 shows an example of a magnetic separation device included in the device according to the third embodiment. This magnetic separation device 50 is formed of an electromagnet, and is disposed partitioning a bottom surface of the mixing tank 7b on an exterior thereof. The magnetic floc 17 formed by adding magnetic powder, or magnetic powder and a coagulating agent, to the suspended substance 16 such as black carbon, soot, or oil and mixing in the mixing tank 7b is attracted by the electromagnet, and accumulated on an interior bottom surface of the mixing tank 7b. By providing a separate operating mode for sludge discharge, sludge wherein the magnetic floc forms a lump can be discharged from the mixing tank 7b via an unshown sludge removal route by causing clean water to flow in place of the wastewater while carrying out agitation in the agitation device 15, with the electromagnet in an off state.

Figure 12:
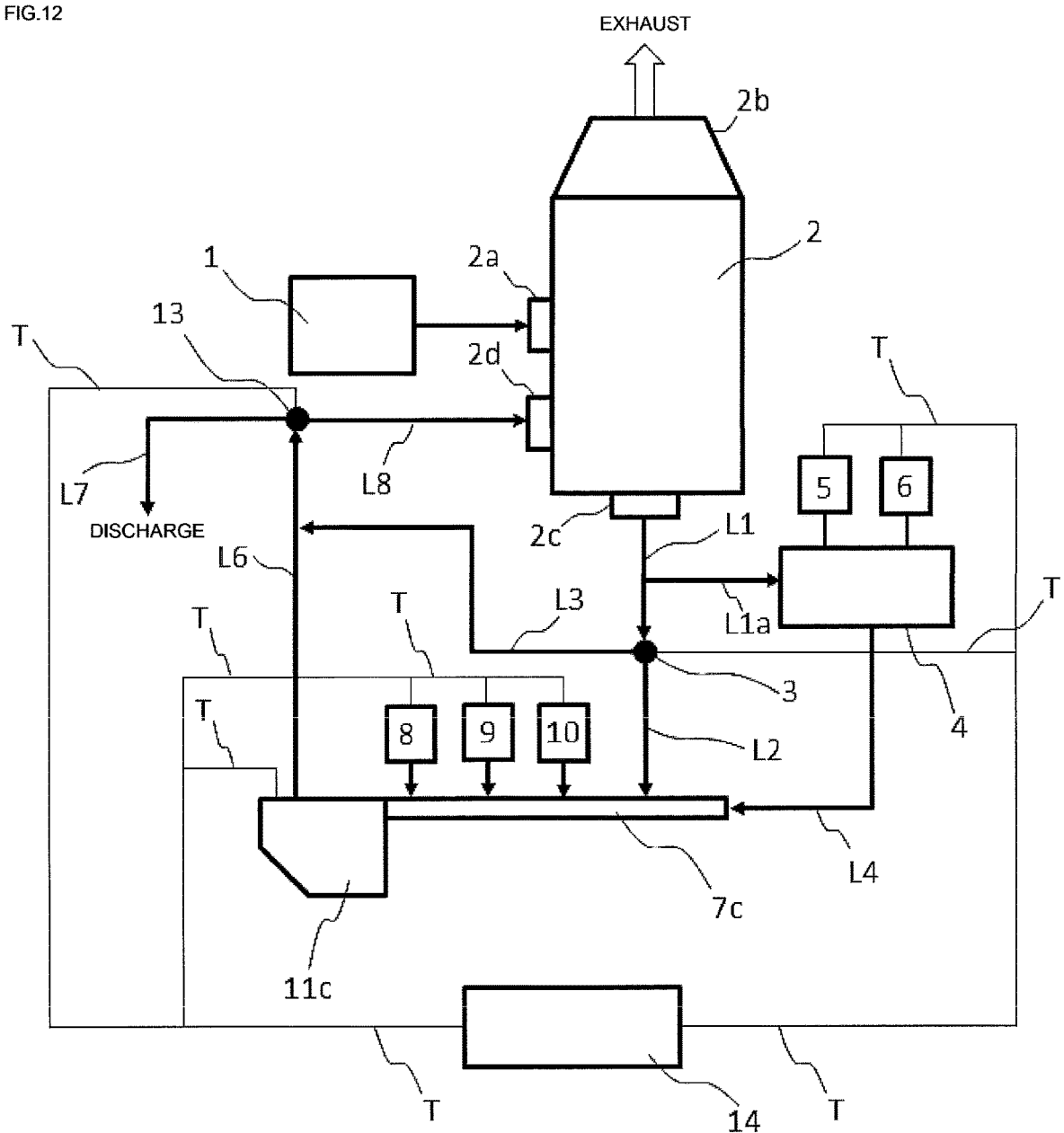
FIG. 12 is a schematic configuration diagram of a device according to a fourth embodiment for implementing the method of the disclosure.

FIG. 12 shows a device according to a fourth embodiment for implementing the method of the disclosure. The device according to this embodiment differs from the device according to the first embodiment in that a mixing pipe 7c including an in-line mixer is provided in place of the mixing tank, the mixing pipe 7c and a magnetic separation device 11c are configured integrally, and furthermore, these structures also perform a function of a sludge tank.

Figure 13:
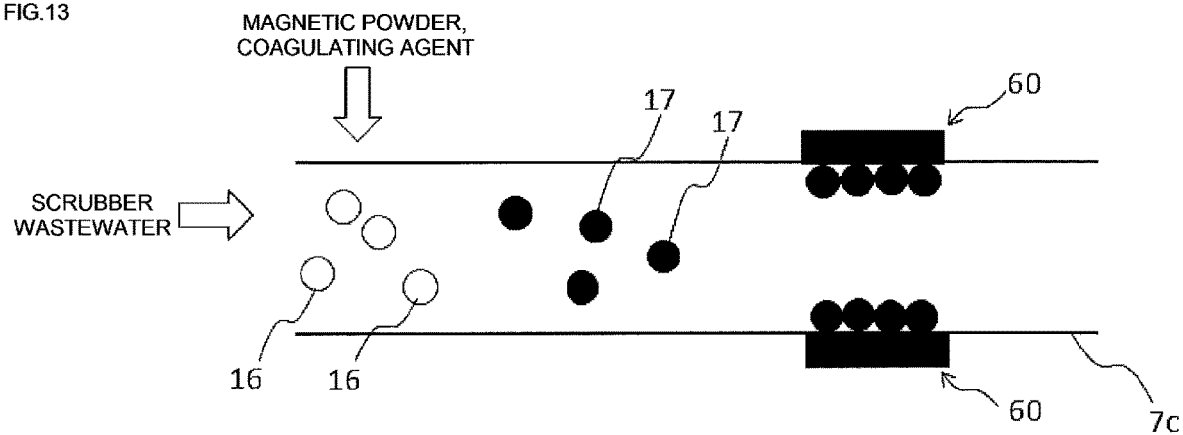
FIG. 13 is a schematic configuration diagram showing an example of a magnetic separation device included in the device according to the fourth embodiment.

FIG. 13 shows an example of a magnetic separation device included in the device according to the fourth embodiment. This magnetic separation device 60 is formed of an electromagnet, and is disposed partitioning a side surface of the mixing pipe 7c including the in-line mixer, on an exterior thereof. The magnetic floc 17 formed by adding magnetic powder, or magnetic powder and a coagulating agent, to the suspended substance 16 such as black carbon, soot, or oil and mixing with the unshown in-line mixer in the mixing pipe 7c is attracted by the electromagnet, and accumulated on an interior side surface of the mixing pipe 7c. By providing a separate operating mode for sludge discharge, sludge wherein the magnetic floc forms a lump can be discharged from the mixing pipe 7c via an unshown sludge removal route by causing clean water to flow in place of the wastewater, with the electromagnet in an off state.

Figure 14:
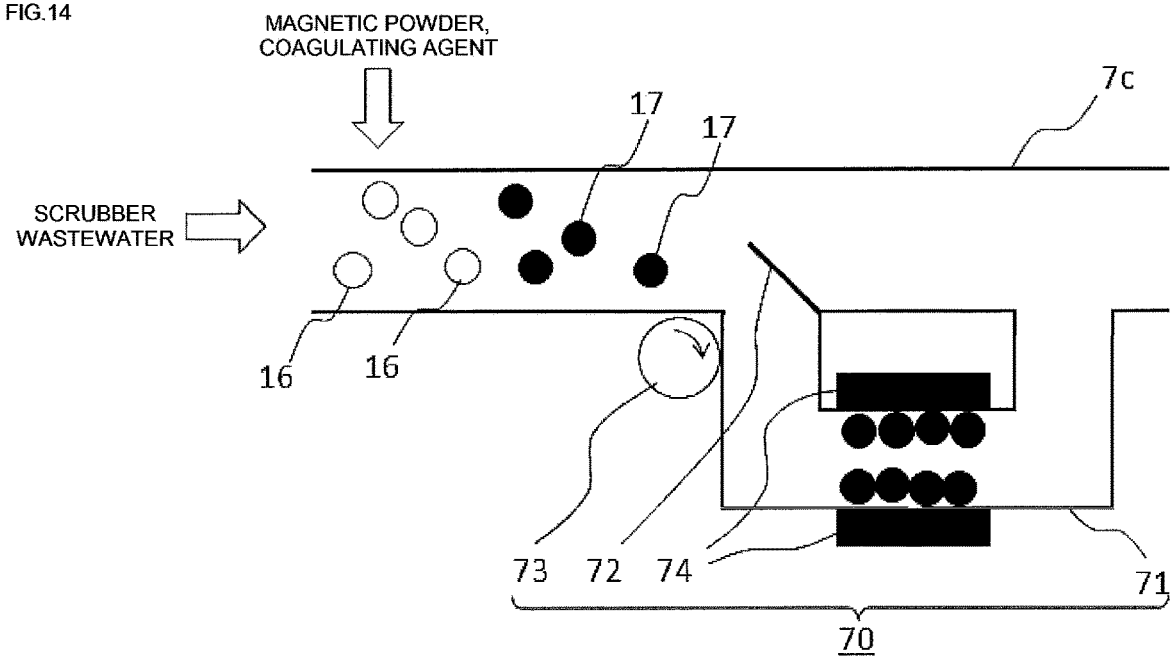
FIG. 14 is a schematic configuration diagram showing another example of a magnetic separation device included in the device according to the fourth embodiment.

FIG. 14 shows another example of a magnetic separation device included in the device according to the fourth embodiment. This magnetic separation device 70 is configured of a sludge storage pipe 71 branching off the mixing pipe 7c including the in-line mixer, a pipeline induction guide 72 disposed in an intersection portion on an interior side surface of a portion that branches off from the mixing pipe 7c to the sludge storage pipe 71, a magnetism generating drum 73 disposed in a position on a pipe exterior opposing the pipeline induction guide 72 and rotating with a predetermined axis of rotation, and an electromagnet 74 disposed partitioning a side surface of the sludge storage pipe 71, on an exterior thereof. The magnetic floc 17 formed by adding magnetic powder, or magnetic powder and a coagulating agent, to the suspended substance 16 such as black carbon, soot, or oil and mixing with the unshown in-line mixer in the mixing pipe 7c is attracted to the sludge storage pipe 71 side by actions of the pipeline induction guide 72 and the magnetism generating drum 73, transferred to the sludge storage pipe 71 together with a flow of wastewater, attracted to the electromagnet 74 disposed on the exterior side surface of the sludge storage pipe 71, and accumulated on an interior side surface of the sludge storage pipe 71. By providing a separate operating mode for sludge discharge, sludge wherein the magnetic floc forms a lump can be discharged from the sludge storage pipe 71 and the mixing pipe 7c via an unshown sludge removal route by causing clean water to flow in place of the wastewater, with the electromagnet in an off state.

Working Example 1

In order to verify an operational advantage of the disclosure, a scrubber wastewater coagulation-sedimentation test has been carried out.

Test Example 1

Exhaust gas of a diesel engine is treated using a scrubber, whereby scrubber wastewater of 240 NTU (formazin) turbidity and 80 mg/L suspended substance concentration is prepared, and polyaluminum chloride (PAC) is added as a coagulating agent so that a coagulating agent mass with respect to suspended substance mass is 100:5. High-speed agitation at 150 rpm is carried out for 20 seconds using a bell-jar stator, after which low-speed agitation at 40 rpm is carried out for 20 minutes, and the wastewater is moved to a measuring cylinder of 500 mL capacity. A height of an interface between a transparent portion and a suspended portion is measured over time as a treatment speed index. Also, as a treatment water quality index, sampling is carried out in a position 2 cm from the water surface after coagulation-sedimentation, and turbidity is measured using a portable torpidimeter 2100Q (made by HACH). Furthermore, that which remains after a supernatant is removed by decantation after coagulation-sedimentation is taken to be sludge, and a moisture content is measured using an infrared moisture meter.

Test Example 2

Other than using ferric polysulfate in place of polyaluminum chloride (PAC) as a coagulating agent, a test example 2 has been carried out in the same way as test example 1.

Test Example 3

Triiron tetraoxide is added as magnetic powder to the scrubber wastewater so that a magnetic powder mass is 1:1 with respect to a suspended substance mass. High-speed agitation at 150 rpm is carried out for 20 seconds using a bell-jar stator, after which the wastewater is moved to a measuring cylinder of 500 mL capacity, and the measuring cylinder is placed on a neodymium magnet. In the same way as in test example 1, the height of an interface between a transparent portion and a suspended portion is measured over time. Also, sampling is carried out in a position 2 cm from the water surface after coagulation-sedimentation, and turbidity is measured. Furthermore, the sludge moisture content is measured.

Test Example 4

Triiron tetraoxide is added as magnetic powder to the scrubber wastewater so that a magnetic powder mass is 1:1 with respect to a suspended substance mass, and furthermore, ferric polysulfate is added as a coagulating agent so that a coagulating agent mass is 100:5 with respect to the suspended substance mass. High-speed agitation at 150 rpm is carried out for 20 seconds using a bell-jar stator, after which the wastewater is moved to a measuring cylinder of 500 mL capacity, and the measuring cylinder is placed on a neodymium magnet. In the same way as in test example 1, the height of an interface between a transparent portion and a suspended portion is measured over time. Also, sampling is carried out in a position 2 cm from the water surface after coagulation-sedimentation, and turbidity is measured. Furthermore, the sludge moisture content is measured.

Comparison Example 1

Figure 15:
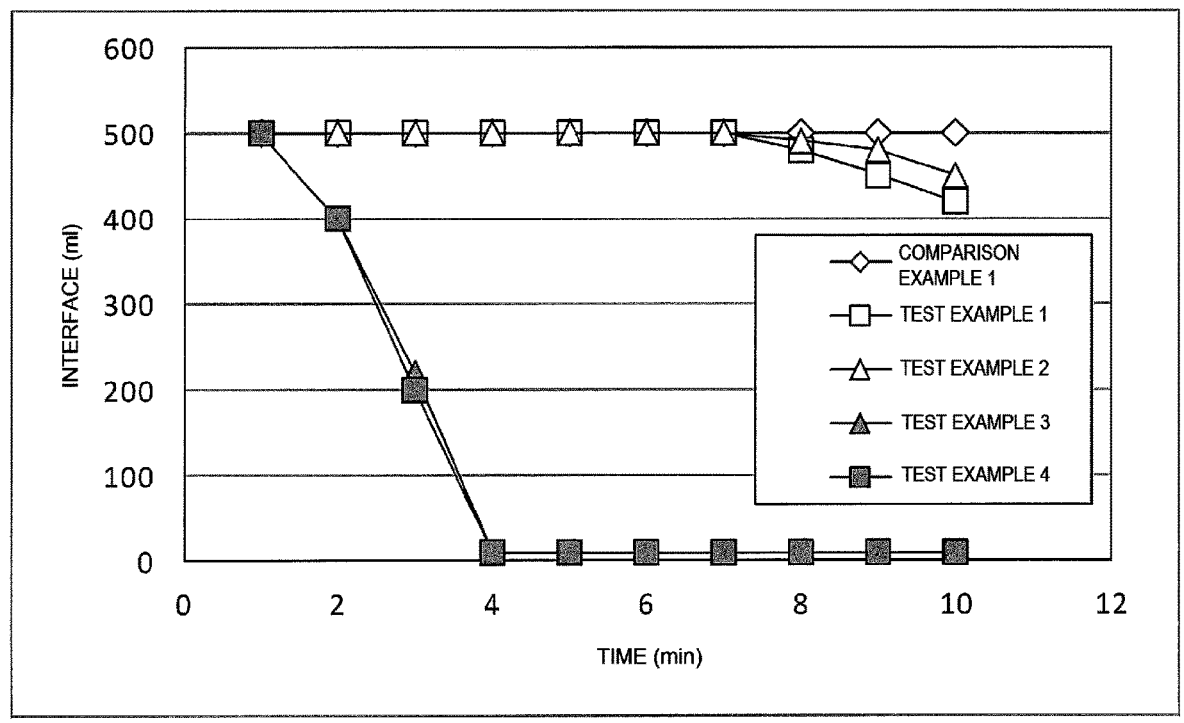
FIG. 15 is a graph showing results of a height of an interface between a transparent portion and a suspended portion being measured over time in a scrubber wastewater coagulation-sedimentation test.

Scrubber wastewater to which nothing is added is taken as a comparison example 1.
(Results)
FIG. 15 shows results of a height of an interface between a transparent portion and a suspended portion. As shown in FIG. 15, hardly any decrease in interface height occurs within the testing time in comparison example 1, or in test examples 1 and 2 in which a coagulating agent is added. As opposed to this, it is seen that in test example 3, in which metallic powder is added, and in test example 4, in which metallic powder and a coagulating agent are added, the interface reaches the vicinity of the bottom of the measuring cylinder in around four minutes, and coagulation-sedimentation is swiftly completed by magnetic separation.

Figure 16:
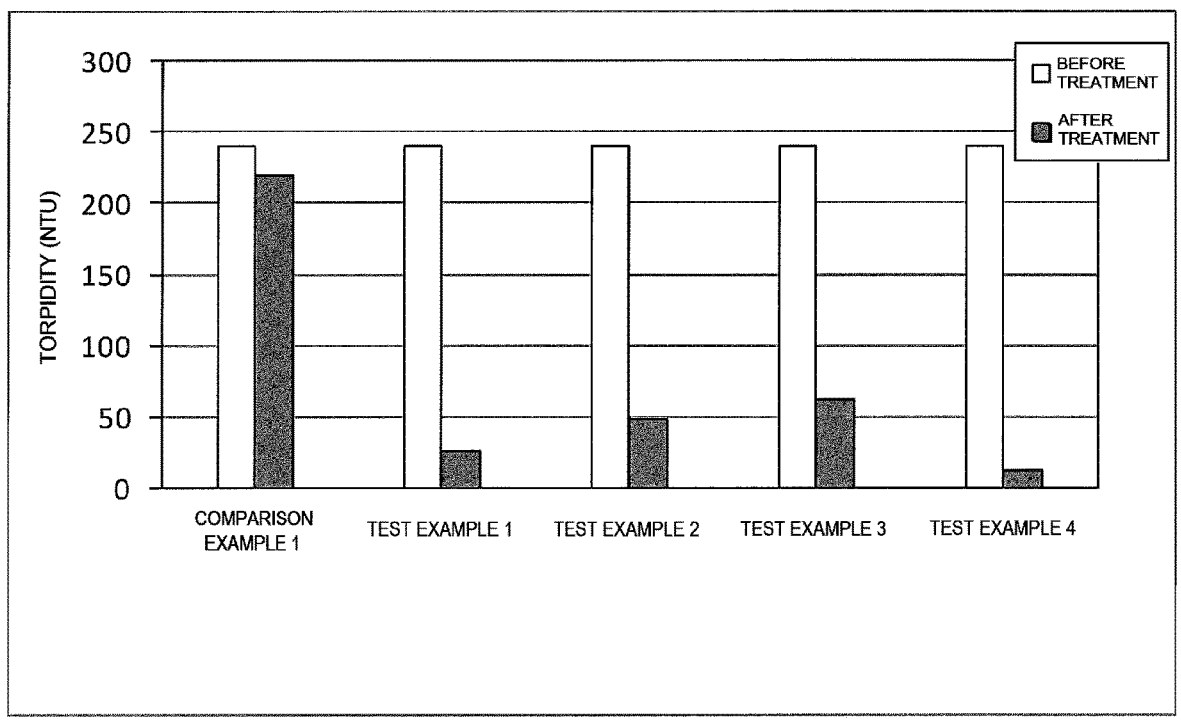
FIG. 16 is a graph showing results of sampling being carried out in a position 2 cm from a water surface, and turbidity being measured, after coagulation-sedimentation in a scrubber wastewater coagulation-sedimentation test.

FIG. 16 shows results of turbidity in a position 2 cm from the water surface. As shown in FIG. 16, hardly any decrease in turbidity in the vicinity of the water surface occurs in comparison example 1. As opposed to this, turbidity in the vicinity of the water surface decreases in test examples 1 and 2, in which a coagulating agent is added, and an improvement in water quality can be confirmed. Meanwhile, turbidity in the vicinity of the water surface also decreases in test example 3, in which metallic powder is added, and in test example 4, in which metallic powder and a coagulating agent are added, and an improvement in water quality can be confirmed. For example, the turbidity after treatment is in the region of 60 NTU in test example 3, in which metallic powder is added, and although the turbidity is a little too high for discharging, it is of a level such that there is no problem in reutilizing in the scrubber. Also, the turbidity decreases to 12 NTU in test example 4, in which metallic powder and a coagulating agent are added, which is a level such that discharging can be carried out.

Figure 17:
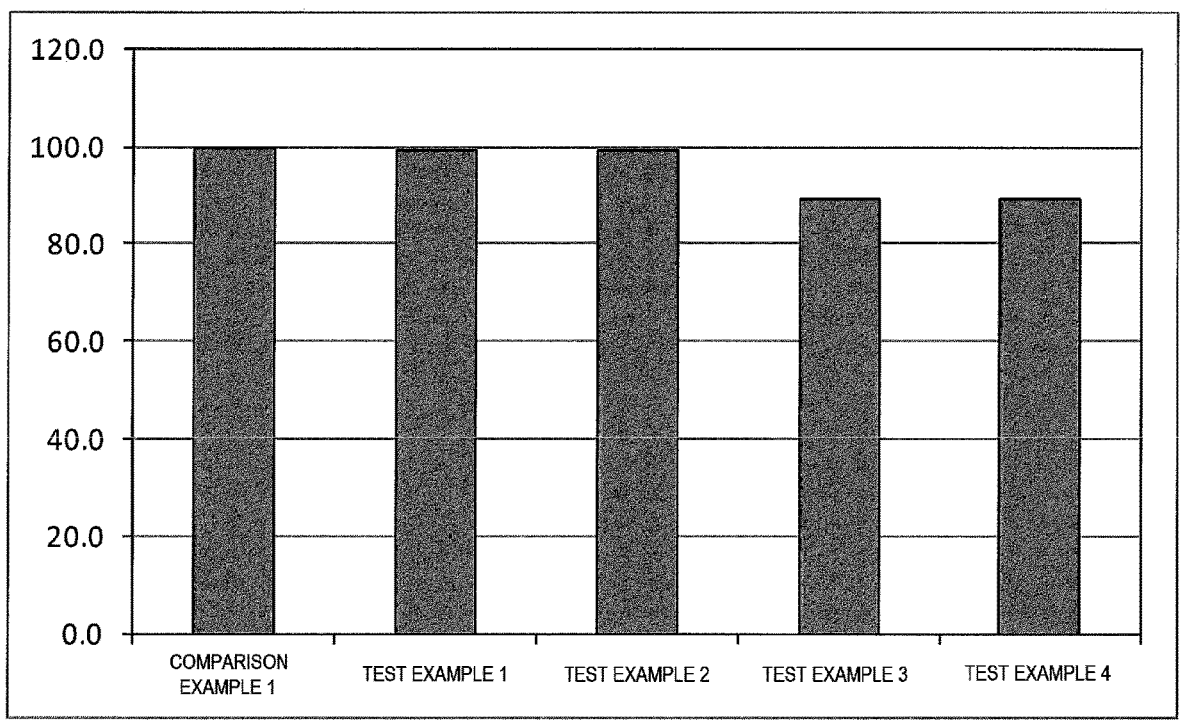
FIG. 17 is a graph showing results of that which remains after a supernatant is removed by decantation after coagulation-sedimentation being taken to be sludge, and a moisture content being measured using an infrared moisture meter, in a scrubber wastewater coagulation-sedimentation test.

FIG. 17 shows results of collected sludge moisture content. In comparison example 1, collecting sludge is difficult, because of which the moisture content of the wastewater itself is measured for the sake of convenience, as a result of which the moisture content is taken to be 100%.

As shown in FIG. 17, the sludge moisture content is high at 99.5% both when using polyaluminum chloride (PAC) as a coagulating agent (test example 1) and when using ferric polysulfate (test example 2). As opposed to this, according to magnetic separation, the moisture content is 89% both in the case of magnetic powder alone in test example 3, and in the case of using magnetic powder and ferric polysulfate concurrently in test example 4. When converting from the moisture content, it is seen that sludge derived from magnetic separation has a volume in the region of one-two hundredth compared with sludge collected using a coagulating agent alone. Also, it is seen that sludge collected using a coagulating agent alone has a low density, because of which the sludge is extremely weak against the power of the water flow and the like, and the sludge is stirred up when decanting, or the like. As opposed to this, it is seen that sludge derived from magnetic separation is in a state attracted to a magnet across a bottom of a receptacle, does not become detached even when the receptacle is inverted, and is extremely strong against the power of the water flow and the like.

Inclusion in this disclosure of any characterization of any product or method of the related art does not imply or admit that such characterization was known in the prior art or that such characterization would have been appreciated by one of ordinary skill in the art at the time a claimed invention was made, even if the product or method itself was known in the prior art at the time of invention of the present disclosure. For example, if a related art document discussed in the foregoing sections of this disclosure constitutes prior art, the inclusion of any characterization of the related art document does not imply or admit that such characterization of the related art document was known in the prior art or would have been appreciated by one of ordinary skill in the art at the time a claimed invention was made, especially if the characterization is not disclosed in the related art document itself.

Although a few embodiments have been shown and described, it would be appreciated by those skilled in the art that changes may be made in these embodiments without departing from the principles and spirit of the invention, the scope of which is defined in the claims and their equivalents.

Reference signs and numerals are as follows:
1: Engine
2: Scrubber
2a: Air inlet
2b: Exhaust port
2c: Drain port
2d: Liquid inlet
3, 13: Valve
4: Measurement tank
5: pH measuring device
6: Water quality measuring device
7, 7a, 7b: Mixing tank
7c: Mixing pipe
8: pH regulating device
9: Magnetic powder adding device
10: Coagulating agent adding device
11, 11a, 11b, 11c, 20, 30, 40, 50, 60, 70: Magnetic separation device
12: Sludge tank
14: Control device
15: Agitating device
16: Suspended substance
17: Magnetic floc
21: Channel
22: Rotating disk
23, 33, 42: Scraper
32, 41: Rotating drum
71: Sludge storage pipe
72: Pipeline induction guide
73: Magnetism generating drum
74: Electromagnet
L1, L1a, L2, L3, L4, L5, L6, L7, L8: Pipe
M: Motor
T: Wiring

What is claimed is:

1. A scrubber wastewater treatment method, comprising:
obtaining a water quality measurement of scrubber wastewater having been generated by treating combustion exhaust gas in a scrubber, the water quality measurement being a measurement of a turbidity or a suspended substance concentration of the scrubber wastewater;
when determining that the water quality measurement is within a first range, discharging the scrubber wastewater or recirculating the scrubber wastewater into the scrubber, without having to undergo removal of suspended substances included in the scrubber wastewater by magnetic separation; and
when determining that the water quality measurement is within a second range which is outside of the first range, performing treatment on the scrubber wastewater by
adding a magnetic powder to the scrubber wastewater,
forming a bound substance comprised of the magnetic powder bound to suspended substances included in the scrubber wastewater, and
magnetically separating the bound substance from the scrubber wastewater to thereby clean the scrubber wastewater, such that the scrubber wastewater is dischargeable or recirculateable into the scrubber.

2. The scrubber wastewater treatment method according to claim 1, wherein the treatment is carried out by:
adding the magnetic powder to the scrubber wastewater, without adding a coagulating agent to the scrubber wastewater prior to the magnetically separating, when determining that the water quality measurement is in a portion of the second range wherein removal of the suspended substance is performable by adding the magnetic powder alone.

3. The scrubber wastewater treatment method according to claim 1, wherein the treatment is carried out by:
adding a coagulating agent to the scrubber wastewater in addition to the magnetic powder, when determining that the water quality measurement is in a portion of the second range wherein removal of the suspended substance cannot be carried out by adding the magnetic powder alone.

4. The scrubber wastewater treatment method according to claim 1, wherein in performing the treatment, the magnetic powder is added in an amount in accordance with the turbidity or suspended substance concentration.

5. The scrubber wastewater treatment method according to claim 2, wherein in performing the treatment, the magnetic powder is added in an amount in accordance with the turbidity or suspended substance concentration.

6. The scrubber wastewater treatment method according to claim 3, wherein in performing the treatment, the magnetic powder and the coagulating agent are added is amounts in accordance with the turbidity or suspended substance concentration.

7. The scrubber wastewater treatment method according to claim 1, wherein
the water quality measurement is of the turbidity of the scrubber wastewater, and
a boundary value between the first range and the second range is a value of turbidity in a range of 25 to 100 NTU.

8. The scrubber wastewater treatment method according to claim 1, wherein
the water quality measurement is of the suspended substance concentration of the scrubber wastewater, and
a boundary value between the first range and the second range is a value of suspended substance concentration in a range of 10 to 50 mg/L.

9. The scrubber wastewater treatment method according to claim 2, wherein
the water quality measurement is of the turbidity of the scrubber wastewater, and
an upper boundary value of the portion of the second range is a value of turbidity in a range of 50 to 150 NTU, and is a value 25 NTU or more greater than a boundary value between the first range and the second range.

10. The scrubber wastewater treatment method according to claim 3, wherein
the water quality measurement is of the turbidity of the scrubber wastewater, and
a lower boundary value of the portion of the second range is a value of turbidity in a range of 50 to 150 NTU, and is a value 25 NTU or more greater than a boundary value between the first range and the second range.

11. The scrubber wastewater treatment method according to claim 5, wherein
the water quality measurement is of the turbidity of the scrubber wastewater, and
an upper boundary value of the portion of the second range is a value of turbidity in a range of 50 to 150 NTU, and is a value 25 NTU or more greater than a boundary value between the first range and the second range.

12. The scrubber wastewater treatment method according to claim 6, wherein
the water quality measurement is of the turbidity of the scrubber wastewater, and
a lower boundary value of the portion of the second range is a value of turbidity in a range of 50 to 150 NTU, and is a value 25 NTU or more greater than a boundary value between the first range and the second range.

13. The scrubber wastewater treatment method according to claim 2, wherein
the water quality measurement is of the suspended substance concentration of the scrubber wastewater, and
a boundary value of the portion of the second range is a value of suspended substance concentration in a range of 20 to 100 mg/L, and is a value 10 mg/L or more greater than a boundary value of the first range and the second range.

14. The scrubber wastewater treatment method according to claim 3, wherein
the water quality measurement is of the suspended substance concentration of the scrubber wastewater, and
a boundary value of the portion of the second range is a value of suspended substance concentration in a range of 20 to 100 mg/L, and is a value 10 mg/L or more greater than a boundary value of the first range and the second range.

15. The scrubber wastewater treatment method according to claim 5, wherein
the water quality measurement is of the suspended substance concentration of the scrubber wastewater, and
a boundary value of the portion of the second range is a value of suspended substance concentration in a range of 20 to 100 mg/L, and is a value 10 mg/L or more greater than a boundary value of the first range and the second range.

16. The scrubber wastewater treatment method according to claim 6, wherein
the water quality measurement is of the suspended substance concentration of the scrubber wastewater, and
a boundary value of the portion of the second range is a value of suspended substance concentration in a range of 20 to 100 mg/L, and is a value 10 mg/L or more greater than a boundary value of the first range and the second range.

17. The scrubber wastewater treatment method according to claim 1, wherein
the method is performed by a system that includes the scrubber that generates the scrubber wastewater, and
the system is configured such that:
when determining that the measurement of turbidity or suspended substance concentration is within the first range, the scrubber wastewater is discharged or recirculated into the scrubber without undergoing removal of suspended substances included in the scrubber wastewater by magnetic separation; and
when determining that the measurement of turbidity or suspended substance concentration is within the second range, the scrubber wastewater is discharged or recirculated into the scrubber after completion of the treatment.

18. A scrubber wastewater treatment device, comprising:
a sensor configured to obtain a water quality measurement of scrubber wastewater having been generated by treating combustion exhaust gas in a scrubber, the water quality measurement being a measurement of a turbidity or a suspended substance concentration of the scrubber wastewater;

a magnetic powder adding device controllable to add a magnetic powder to the scrubber wastewater;

a controller configured to control an amount of the magnetic powder added by the magnetic powder adding device in accordance with the water quality measurement obtained by the sensor, the controller being configured to determine whether the water quality measurement is in a first range or a second range which is outside the first range, such that when the controller determines that the water quality measurement is in the first range, control the scrubber wastewater treatment device to discharge the scrubber wastewater or cause the scrubber wastewater to be recirculated into the scrubber, without causing the scrubber wastewater to undergo removal of suspended substances included in the scrubber wastewater by magnetic separation, and when the controller determines that the water quality measurement is in the second range:

control the magnetic powder adding device to add the magnetic powder to the scrubber wastewater, and control a magnetic separator to perform a magnetic separation process of magnetically separating a bound substance, comprised of the magnetic powder bound to suspended substances included in the scrubber wastewater, from the scrubber wastewater to thereby clean the scrubber wastewater.

19. The scrubber wastewater treatment device according to claim 18, further comprising a coagulating agent adding device controllable to add a coagulating agent to the scrubber wastewater, wherein when the controller determines that the water quality measurement is in a first portion of the second range, wherein removal of the suspended substance is performable by adding the magnetic powder alone, the controller is configured to control the magnetic powder adding device to add the magnetic powder to the scrubber wastewater, without controlling the coagulant agent adding device to add the coagulating agent prior to subjecting the scrubber wastewater to the magnetic separation process, and when the controller determines that the water quality measurement is in a second portion of the second range, wherein removal of the suspended substance is not performable by adding the magnetic powder alone, the controller is configured to control the magnetic powder adding device and the coagulating agent adding device to respectively add the magnetic powder and the coagulating agent to the scrubber wastewater.

20. A system comprising:

the scrubber wastewater treatment device according to claim 18; and the scrubber that generates the scrubber wastewater, the scrubber configured to provide the scrubber wastewater to the scrubber wastewater treatment device, and to reuse the scrubber wastewater after the scrubber wastewater has passed through the scrubber wastewater treatment device.

* * * * *